(12) United States Patent
Sangaraju et al.

(10) Patent No.: US 12,014,402 B2
(45) Date of Patent: Jun. 18, 2024

(54) METHOD AND SYSTEM FOR EVENT-DRIVEN BILLING

(71) Applicant: JPMorgan Chase Bank, N.A., New York, NY (US)

(72) Inventors: Hari Sangaraju, Tampa, FL (US); Srinivas Kasani, Tampa, FL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/065,068

(22) Filed: Oct. 7, 2020

(65) Prior Publication Data

US 2022/0108364 A1    Apr. 7, 2022

(51) Int. Cl.
| | |
|---|---|
| *H04K 1/00* | (2006.01) |
| *G06F 9/48* | (2006.01) |
| *G06Q 10/109* | (2023.01) |
| *G06Q 30/04* | (2012.01) |
| *G06Q 40/02* | (2023.01) |
| *G06Q 40/04* | (2012.01) |
| *G06Q 40/12* | (2023.01) |
| *H04L 9/00* | (2022.01) |

(52) U.S. Cl.
CPC .......... *G06Q 30/04* (2013.01); *G06F 9/4881* (2013.01); *G06Q 10/109* (2013.01); *G06Q 40/02* (2013.01); *G06Q 40/04* (2013.01); *G06Q 40/12* (2013.12)

(58) Field of Classification Search
CPC ...... G06Q 30/04; G06Q 40/12; G06Q 10/109; G06Q 40/02; G06Q 40/04; G06F 9/4881
See application file for complete search history.

(56) References Cited

U.S. PATENT DOCUMENTS

| | | | | |
|---|---|---|---|---|
| 6,385,595 B1* | 5/2002 | Kolling | ........... | G06Q 30/04 705/40 |
| 2002/0087455 A1* | 7/2002 | Tsagarakis | ........... | G06Q 30/06 705/64 |
| 2009/0043689 A1* | 2/2009 | Yang | ........... | G06Q 20/102 705/38 |
| 2009/0222366 A1* | 9/2009 | Cao | ........... | G06Q 30/02 705/400 |
| 2019/0354979 A1* | 11/2019 | Crawford | ........... | G06Q 20/102 |

* cited by examiner

*Primary Examiner* — Talia F Crawley

(74) *Attorney, Agent, or Firm* — Greenblum & Bernstein, P.L.C.

(57) ABSTRACT

A method and a system for providing event-driven billing that facilitates flexibility and customization for bill generation, payment scheduling, and account reconciliation in relation to consumer financial accounts are provided. The method includes: receiving, from a user, first information that relates to a schedule for generating the bill for the account; extracting, from the first information, at least one criterion for determining the schedule for generating the bill; determining the schedule based on the at least one criterion; and generating the bill based on the determined schedule.

16 Claims, 9 Drawing Sheets

METHOD AND SYSTEM FOR EVENT-DRIVEN BILLING

BACKGROUND

1. Field of the Disclosure

This technology generally relates to methods and systems for generating bills for consumer financial accounts, and more particularly, to methods and systems for providing event-driven billing that facilitates flexibility and customization for bill generation, payment scheduling, and account reconciliation in relation to consumer financial accounts.

2. Background Information

Consumer financial accounts are administered by financial institutions, such as banks and credit unions, in order to provide consumers with a variety of tools for conducting transactions. Examples of consumer financial accounts include checking accounts, savings accounts, and charge card accounts.

In many instances, a consumer is provided with a card, such as a credit card, debit card, a charge card, and/or a bank card, that is associated with one or more financial accounts. The card is usable by the consumer for conducting a transaction. When a transaction is conducted, the amount of the transaction is recorded in connection with the financial account. Periodically, a bill is generated to notify the consumer of the transactions that have been concluded and to request payment therefor, and then a payment is made by the consumer. Typically, the period for such bill generation is one month, or approximately every thirty (30) calendar days.

Conventional billing systems are designed to generate bills on a periodic basis, often a monthly basis. However, in some situations, the periodicity of the bill generation may cause unnecessary additional costs, such as costs associated with foreign exchange and/or currency conversion, or costs associated with timing of a payment. Accordingly, there is a need for a mechanism for providing flexibility in generation of bills in association with consumer financial accounts.

SUMMARY

The present disclosure, through one or more of its various aspects, embodiments, and/or specific features or sub-components, provides, inter alia, various systems, servers, devices, methods, media, programs, and platforms for providing event-driven billing that facilitates flexibility and customization for bill generation, payment scheduling, and account reconciliation in relation to consumer financial accounts.

According to an aspect of the present disclosure, a method for providing event-driven billing that facilitates flexibility and customization for bill generation, payment scheduling, and account reconciliation in relation to consumer financial accounts is provided. The method is implemented by at least one processor. The method includes: receiving, from a user by the at least one processor, first information that relates to a schedule for generating the bill for the account; extracting, from the first information by the at least one processor, at least one criterion for determining the schedule for generating the bill; determining the schedule based on the at least one criterion; and generating the bill based on the determined schedule.

The user may be a person that is responsible for making payments that relate to the account based on the generated bill.

The first information may include information indicating that the schedule for generating the bill is to be determined based on an occurrence of a first event of a predetermined event type.

The predetermined event type may include an execution of a transaction that involves a foreign currency.

The predetermined event type may include an execution of a transaction that involves an amount that exceeds a predetermined threshold amount.

The first information may include information indicating that the schedule for generating the bill is to be determined based on a periodic time interval that is selected by the user.

The first information may include information indicating that the schedule for generating the bill is to be determined based on a balance of the account exceeding a threshold dollar amount that is selected by the user.

The user may be affiliated with a financial institution that administers the account.

The first information may include information indicating that the schedule for generating the bill is to be determined based on a balance of the account exceeding a threshold dollar amount that is determined by the financial institution.

The first information may include information indicating that the schedule for generating the bill is to be determined based on a reward to be provided to a person that is responsible for making payments that relate to the account based on the generated bill.

According to another exemplary embodiment, a computing apparatus for generating a bill for an account is provided. The computing apparatus includes a processor, a memory, and a communication interface coupled to each of the processor and the memory. The processor is configured to receive from a user via the communication interface, first information that relates to a schedule for generating the bill for the account; extract, from the first information by the at least one processor, at least one criterion for determining the schedule for generating the bill; determine the schedule based on the at least one criterion; and generate the bill based on the determined schedule.

The user may be a person that is responsible for making payments that relate to the account based on the generated bill.

The first information may include information indicating that the schedule for generating the bill is to be determined based on an occurrence of a first event of a predetermined event type.

The predetermined event type may include an execution of a transaction that involves a foreign currency.

The predetermined event type may include an execution of a transaction that involves an amount that exceeds a predetermined threshold amount.

The first information may include information indicating that the schedule for generating the bill is to be determined based on a periodic time interval that is selected by the user.

The first information may include information indicating that the schedule for generating the bill is to be determined based on a balance of the account exceeding a threshold dollar amount that is selected by the user.

The user may be affiliated with a financial institution that administers the account.

The first information may include information indicating that the schedule for generating the bill is to be determined based on a balance of the account exceeding a threshold dollar amount that is determined by the financial institution.

The first information may include information indicating that the schedule for generating the bill is to be determined based on a reward to be provided to a person that is responsible for making payments that relate to the account based on the generated bill.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
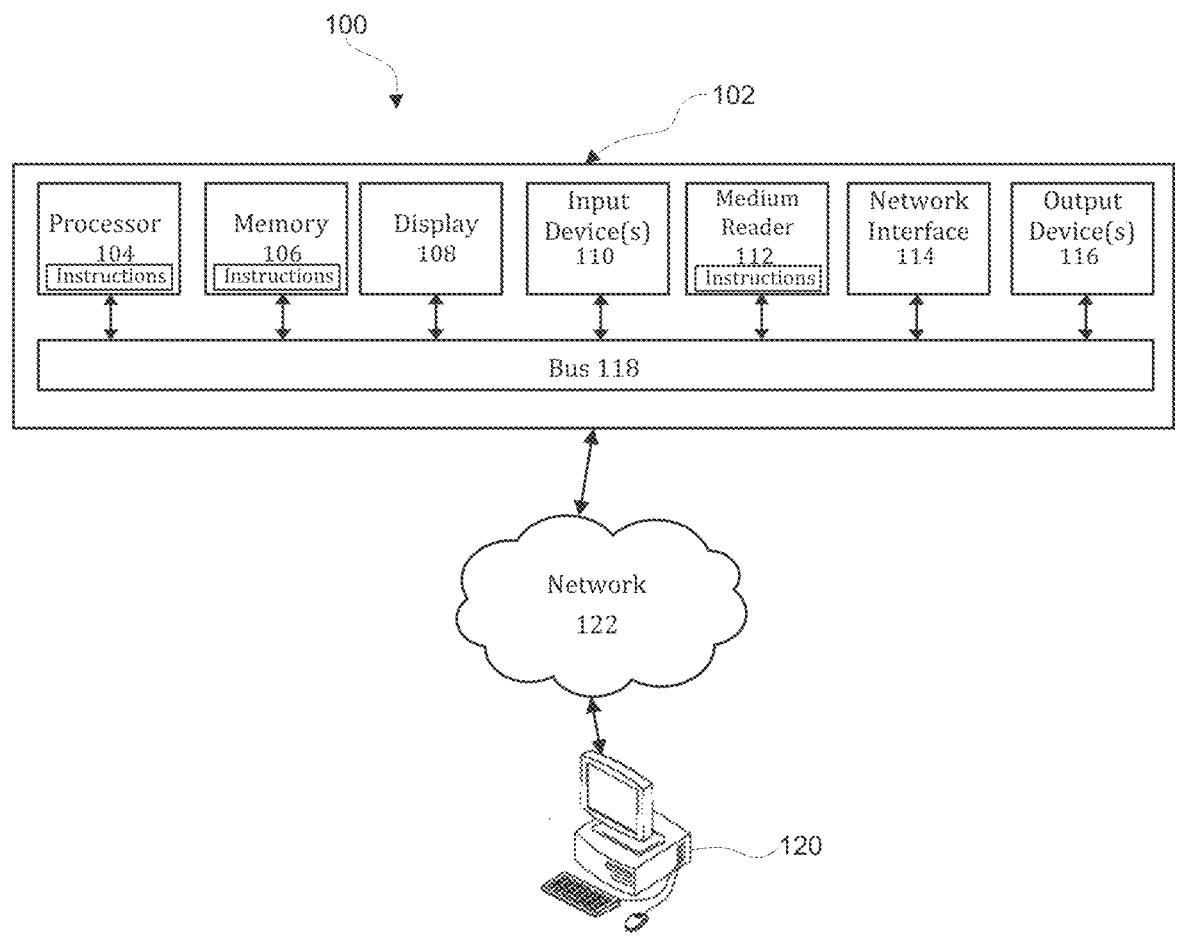
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carver wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk or any, other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (MED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 dining execution by the computer system 102.

Furthermore, the computer system 102 may include any additional devices, components, parts, peripherals, hardware, software or any combination thereof which are commonly known and understood as being included with or within a computer system, such as, hut not limited to, a network interface 114 and an output device 116. The output device 116 may be, hut is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing event-driven billing that facilitates flexibility and customization for bill generation, payment scheduling, and account reconciliation in relation to consumer financial accounts.

Figure 2:
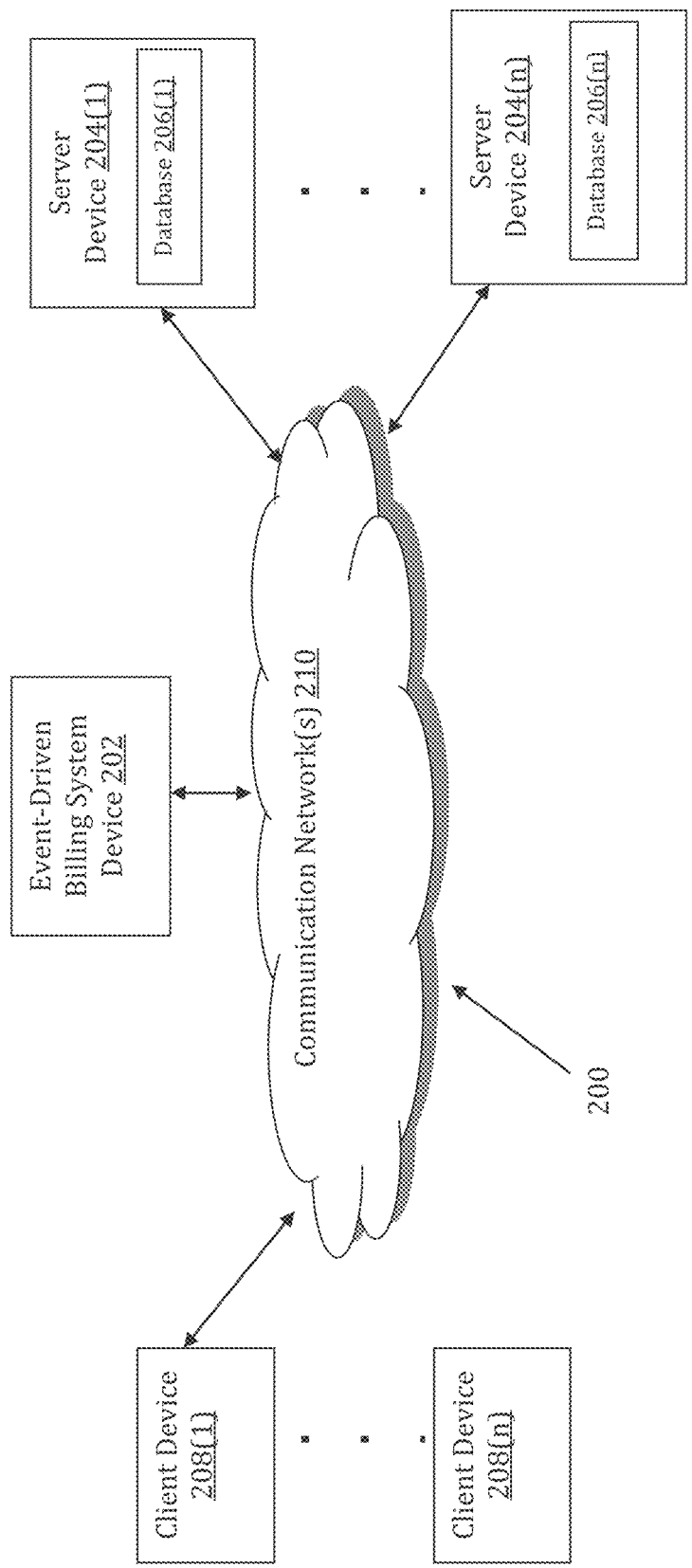
FIG. 2 illustrates an exemplary diagram of a network environment.

Referring to FIG. 2, a schematic of an exemplary network environment 200 for implementing a method for providing event-driven billing that facilitates flexibility and customization for bill generation, payment scheduling, and account reconciliation in relation to consumer financial accounts is illustrated. In an exemplary embodiment, the method is executable on any networked computer platform, such as, for example, a personal computer (PC).

The method for providing event-driven billing that facilitates flexibility and customization for bill generation, payment scheduling, and account reconciliation in relation to consumer financial accounts may be implemented by an Event-Driven Billing System (EDBS) device 202. The EDBS device 202 may be the same or similar to the computer system 102 as described with respect to FIG. 1. The EDBS device 202 may store one or more applications that can include executable instructions that, when executed by the EDBS device 202, cause the EDBS device 202 to perform actions, such as to transmit, receive or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the EDBS device 202 itself, may be located in virtual server(s) running in a cloud-based computing environment rather than being tied to one or more specific physical network computing devices. Also, the application(s) may be running in one or more virtual machines (VMs) executing on the EDBS device 202. Additionally, in one or more embodiments of this technology, virtual machine(s) running on the EDBS device 202 may be managed or supervised by a hypervisor.

In the network environment 200 of FIG. 2, the EDBS device 202 is coupled to a plurality of server devices 204(1)-204(n) that hosts a plurality of databases 206(1)-206(n), and also to a plurality of client devices 208(1)-208(n) via communication network(s) 210. A communication interface of the EDBS device 202, such as the network interface 114 of the computer system 102 of FIG. 1, operatively couples and communicates between the EDBS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EDBS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and EDBS devices that efficiently implement a method for providing event-driven billing that facilitates flexibility and customization for bill generation, payment scheduling, and account reconciliation in relation to consumer financial accounts.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EDBS device 202 may be a standalone device or integrated with one or more other devices or apparatuses, such as one or more of the server devices 204(1)-204(n), for example. In one particular example, the EDBS device 202 may include or be hosted by one of the server devices 204(1)-204(n), and other arrangements are also possible. Moreover, one or more of the devices of the EDBS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EDBS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store consumer financial account information and account-related transactions and events that correspond to bill generation.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the EDBS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the EBBS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the EDBS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EDBS device 202, the server devices 204(1)-204(n), or the client devices 208(1)-208(n), for example, may be configured to operate as virtual instances on the same physical machine. In other words, one or more of the EDBS device 202, the server devices 204(1)-204(n), or the client devices 208(1)-206(n) may operate on the same physical device rather than as separate devices communicating through communication network(s) 210. Additionally, there may be more or fewer EDBS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer systems(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
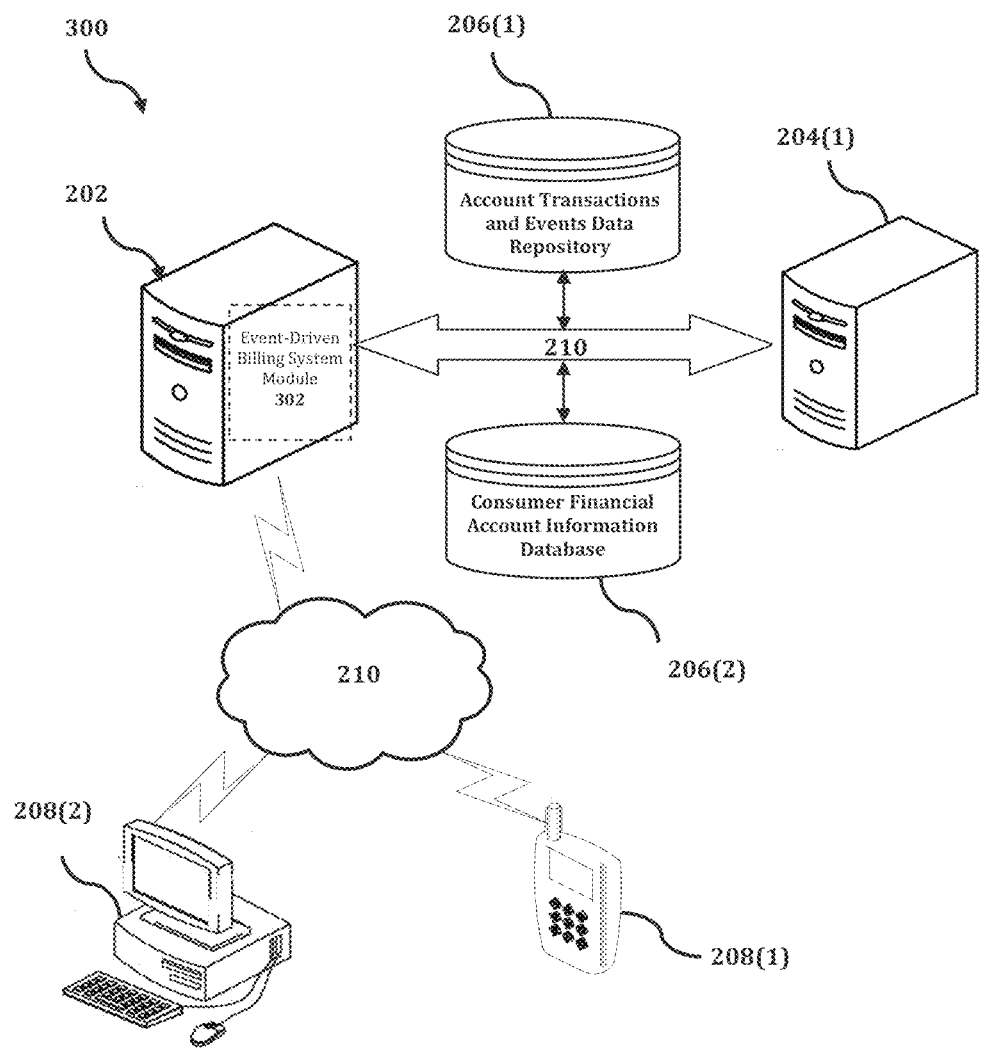
FIG. 3 shows an exemplary system for implementing a method for providing event-driven billing that facilitates flexibility and customization for bill generation, payment scheduling, and account reconciliation in relation to consumer financial accounts.

The EDBS device 202 is described and shown in FIG. 3 as including an event-driven billing system module 302, although it may include other rules, policies, modules, databases, or applications, for example. As will be described below the event-driven billing system module 302 is configured to implement a method for providing event-driven billing that facilitates flexibility and customization for bill generation, payment scheduling, and account reconciliation in relation to consumer financial accounts in an automated, efficient, scalable, and reliable manner.

An exemplary process 300 for implementing a method for providing event-driven billing that facilitates flexibility and customization for bill generation, payment scheduling, and account reconciliation in relation to consumer financial accounts by utilizing the network environment of FIG. 2 is shown as being executed in FIG. 3. Specifically, a first client device 208(1) and a second client device 208(2) are illustrated as being in communication with EDBS device 202. In this regard, the first client device 208W and the second client device 208(2) may be "clients" of the EBBS device 202 and are described herein as such. Nevertheless, it is to be known and understood that the first client device 208(1) and/or the second client device 208(2) need not necessarily be "clients" of the EBBS device 202, or any entity described in association therewith herein. Any additional or alternative relationship may exist between either or both of the first client device 208(1) and the second client device 208(2) and the EBBS device 202, or no relationship may exist.

Further, EDBS device 202 is illustrated as being able to access an account transactions and events data repository 206(1) and a consumer financial account information database 206(2). The event-driven billing system module 302 may be configured to access these databases for implementing a method for providing event-driven billing that facilitates flexibility and customization for bill generation, payment scheduling, and account reconciliation in relation to consumer financial accounts.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the EDBS device 202 via broadband or cellular communication. Of course, these embodiments are merely exemplary and are not limiting or exhaustive.

Upon being started, the event-driving billing system nodule 302 executes a process for providing event-driven billing that facilitates flexibility and customization for bill generation, payment scheduling, and account reconciliation in relation to consumer financial accounts. An exemplary process for providing event-driven billing that facilitates flexibility and customization for bill generation, payment scheduling, and account reconciliation in relation to consumer financial accounts is generally indicated at flowchart 400 in FIG. 4.

Figure 4:
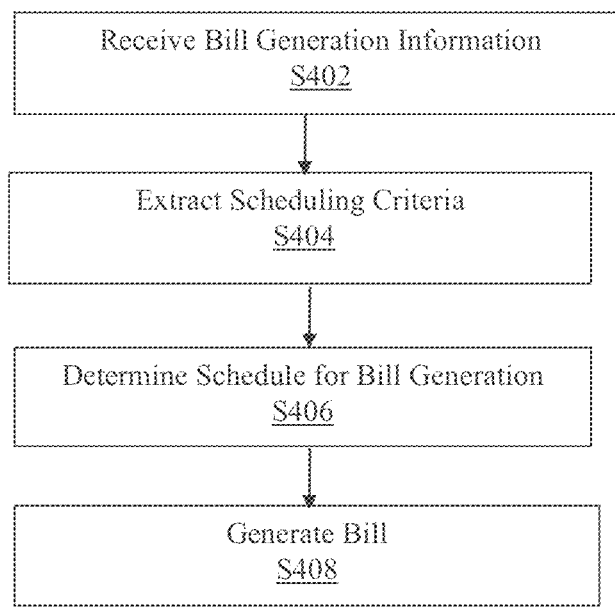
FIG. 4 is a flowchart of an exemplary process for implementing a method for providing event-driven billing that facilitates flexibility and customization for bill generation, payment scheduling, and account reconciliation in relation to consumer financial accounts.

In the process 400 of FIG. 4, at step S402, the event-driven billing system module 302 receives information that relates to a schedule for generating a bill for an account. In an exemplary embodiment, the account is a consumer financial account, and the information is received from a user, such as, for example, a person that is responsible for making payments on the account, i.e., an account owner, or a person that is affiliated with a financial institution that administers the account, i.e., a bank employee.

At step S404, the event-driven billing system module 302 extracts scheduling criteria from the information received in step S402. In an exemplary embodiment, the scheduling criteria may include an occurrence of an event of a predetermined event type, such as an execution of a transaction that involves a foreign currency and/or an execution of a transaction having an amount that exceeds a predetermined threshold amount. The scheduling criteria may include a periodic time interval that is selected by the account owner, and/or a balance of the account exceeding a threshold dollar amount that is selected by the account owner or determined by the financial institution. The scheduling criteria may also include a trigger for generating a bill based on a reward that has been earned by the account owner.

At step S406, the event-driven billing system module 302 determines the schedule for generating the bill based on the scheduling criteria extracted in step S404. In an exemplary embodiment, the schedule may be determined based on an occurrence of a triggering event, or based on the elapsement of a periodic time interval. Then, at step S408, the event-driven billing system module 302 generates the bill based on the determined schedule.

Figure 5:
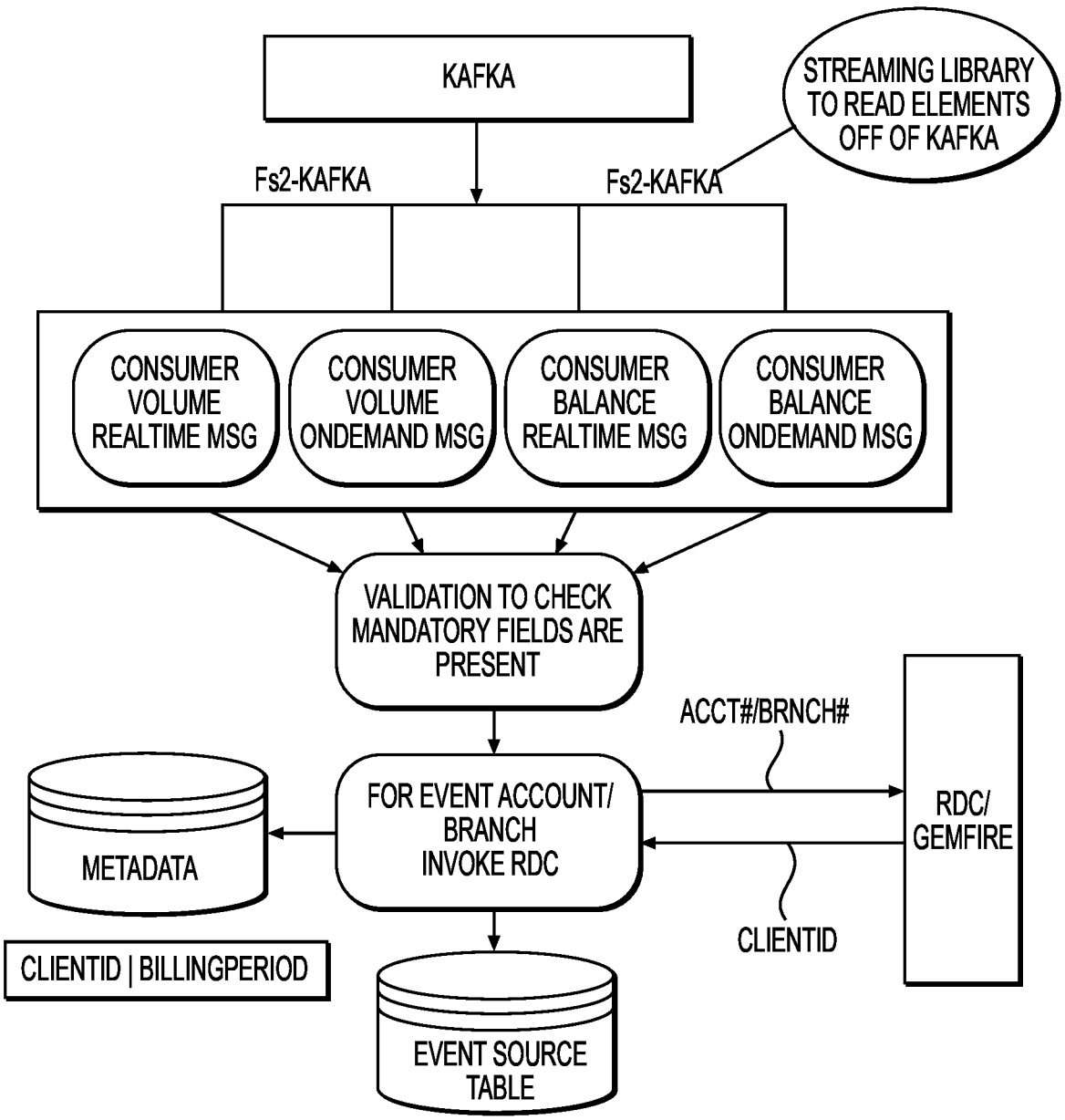
FIG. 5 is a data flow diagram that illustrates an event capture process that is implemented in connection with a method for providing event-driven billing that facilitates flexibility and customization for bill generation, payment scheduling, and account reconciliation in relation to consumer financial accounts, in accordance with an exemplary embodiment.

FIG. 5 is a data flow diagram 500 that illustrates an event capture process that is implemented in connection with a method for providing event-driven billing that facilitates flexibility and customization for bill generation, payment scheduling, and account reconciliation in relation to consumer financial accounts, in accordance with an exemplary embodiment. Events are captured using Kafka as a stream-processing software platform and using an account number as a key, and the events are categorized as relating to consumer volume and/or consumer balance for a particular account. A validation is performed to check whether mandatory fields are present. For each captured event, an account number and a branch number are used to obtain client identification information, and the client identification information and corresponding billing period information are stored in a metadata memory. A record of each captured event is stored in an event source table memory.

Figure 6:
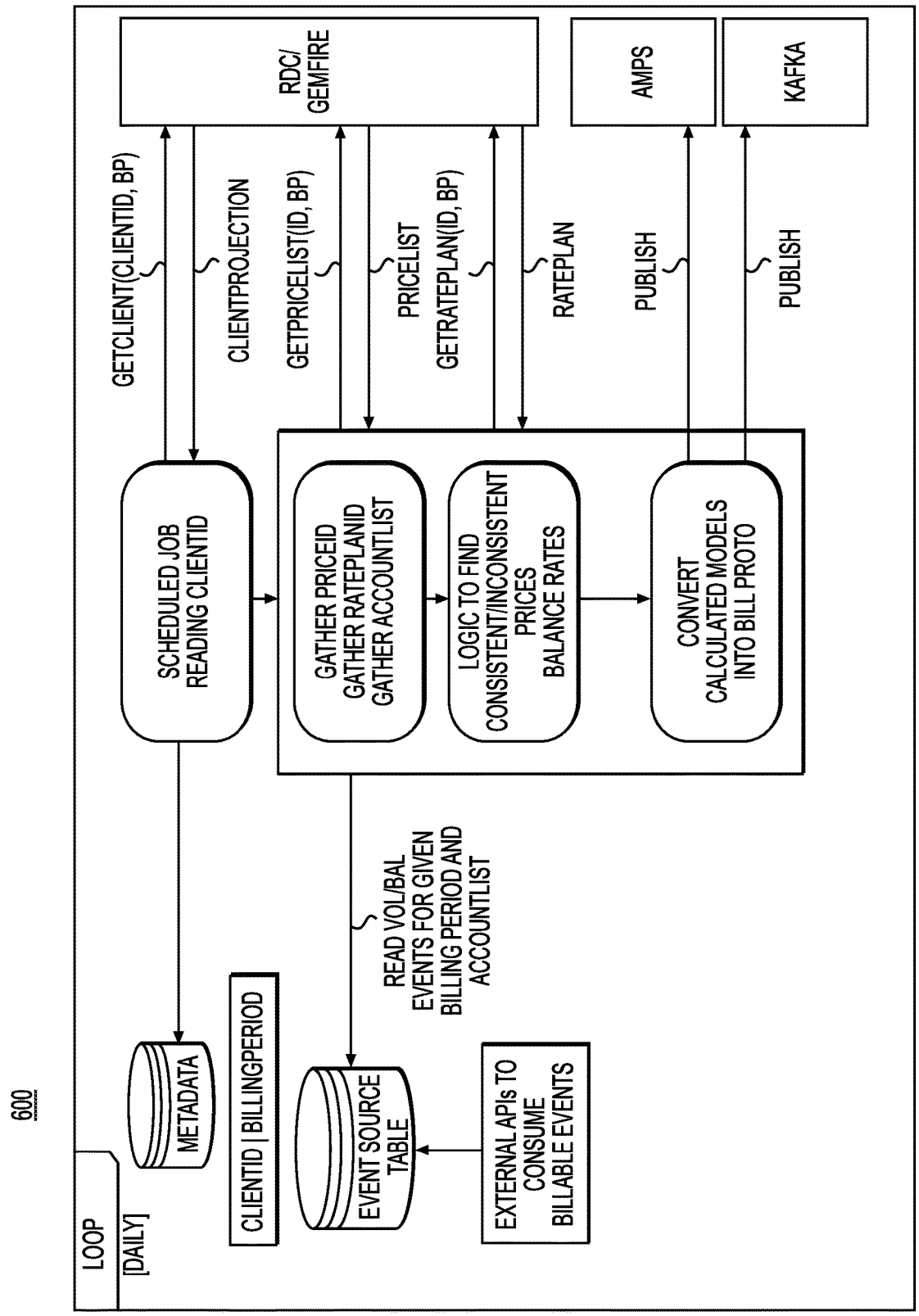
FIG. 6 is a data flow diagram that illustrates a bill creation process that is implemented in connection with a method for providing event-driven billing that facilitates flexibility and customization for bill generation, payment scheduling, and account reconciliation in relation to consumer financial accounts, in accordance with an exemplary embodiment.

FIG. 6 is a data flow diagram 600 that illustrates a bill creation process that is implemented in connection with a method for providing event-driven billing that facilitates flexibility and customization for bill generation, payment scheduling, and account reconciliation in relation to consumer financial accounts, in accordance with an exemplary embodiment. For a scheduled bill creation job, the client identification information and the corresponding billing period information are retrieved from the metadata memory. The bill creation process includes reading volume and balance events for a particular billing period and reading an account list from the event source table memory; gathering price identification information and rate plan identification information; applying logic to find consistencies and/or inconsistencies in prices and balance rates; and converting calculated models into a bill prototype. The event source table accesses external application programming interfaces (APIs) in order to consume billable events.

According to an exemplary embodiment, a Billing Engine is component-, driven for scalability and performance. The Billing Engine has three components, each of which has a unique responsibility. The task of the first component is to consume billable events from a message bus, decode these messages, validate the different elements in each message, and insert the results thereof into the database. This component may be referred to as a "write side" of the Billing Engine.

The task of the second component is to fetch a list of all the billable accounts from the database and publish these accounts onto a message bus. This component may be referred to as a "publisher" of the Billing Engine. The publisher facilitates a generation of a bill for one customer, a subset of customers, or the entire customer base. As a result, different billable cycles may be used for different customers (accounts).

The task of the third component is to read all the billable accounts from the message bus; make the necessary cabs into the in-memory data store to get the necessary reference data, such as pricing data and account hierarchy; and calculate the bill. All the calculation methods needed to generate the bill are coded into this component. This component may be referred to as a "read side" of the Billing Engine.

Figure 7:
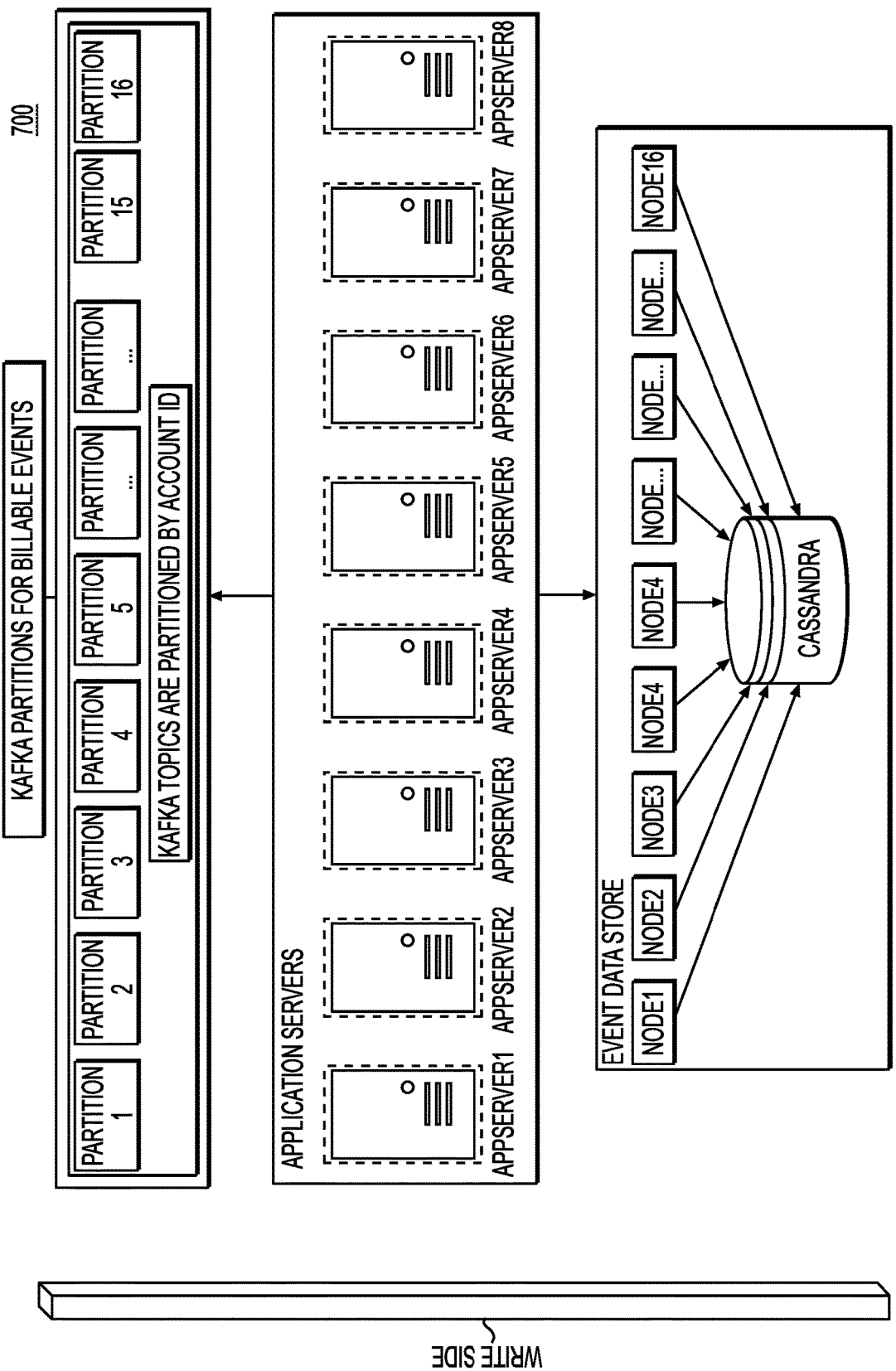
FIG. 7 is a block diagram that illustrates a write side of an architecture of a system that implements a method for providing event-driven billing that facilitates flexibility and customization for bill generation, payment scheduling, and account reconciliation in relation to consumer financial accounts, in accordance with an exemplary embodiment.

FIG. 7 is a block diagram 700 that illustrates a write side of an architecture of a system that implements a method for providing event-driven billing that facilitates flexibility and customization for bill generation, payment scheduling, and account reconciliation in relation to consumer financial accounts, in accordance with an exemplary embodiment.

In an exemplary embodiment, the message bus used for consuming billable events is Kafka. The topics in Kafka for consuming the billable events are partitioned by the account identification number of the customer. This allows the ability to capture all the billable events related to a particular customer in the same partition. The application servers are always listening to the billable events published on Kafka. This facilitates the consumption of messages as soon as they are published. The write side component can be easily scaled by increasing either or both of the number of partitions on Kafka or the number of application servers. The database is indexed so that querying huge amounts of data is relatively easy. The data store that is used to save the billable events is Cassandra. In one exemplary embodiment, sixteen (16) Kafka partitions and eight (8) application servers that are connected to the Kafka partitions are used. Even if one application server goes down, Kafka rebalances in order to load-balance the data.

Figure 8:
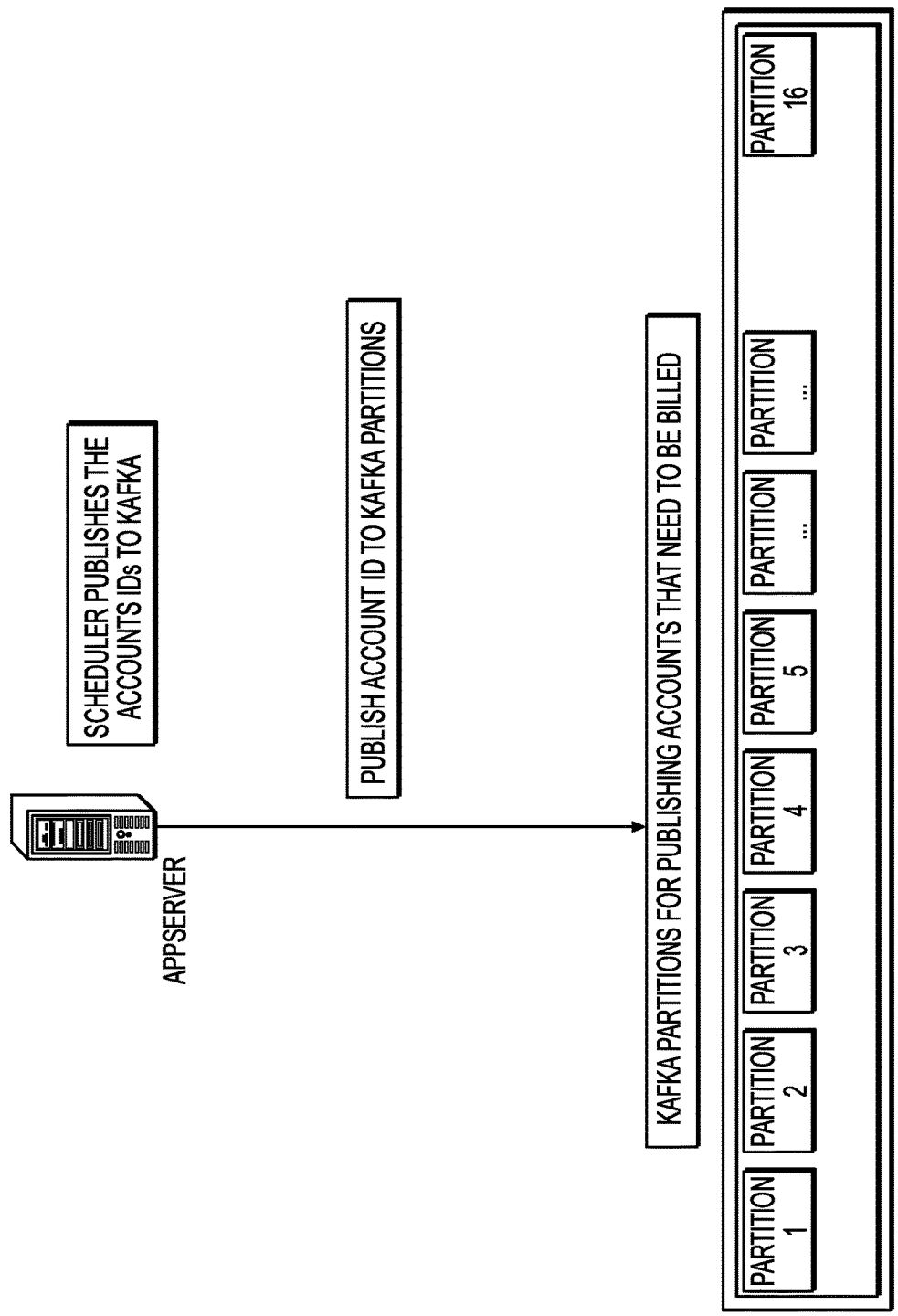
FIG. 8 is a block diagram that illustrates a publisher portion of an architecture of a system that implements a method for providing event-driven billing that facilitates flexibility and customization for bill generation, payment scheduling, and account reconciliation in relation to consumer financial accounts, in accordance with an exemplary embodiment.

FIG. 8 is a block diagram 800 that illustrates a publisher portion of an architecture of a system that implements a method for providing event-driven billing that facilitates flexibility and customization for bill generation, payment scheduling, and account reconciliation in relation to consumer financial accounts, in accordance with an exemplary embodiment.

The publisher selects the list of accounts for which bills need to be generated and then publishes them onto a Kafka topics. In order to enable parallelism, 16 partitions are used. Although the publisher is simpler than either of the write side or the read side, the publisher has the responsibility to be the trigger for the accounts. In an exemplary embodiment, the list of accounts may include one account, a selected list of accounts, or the complete list of accounts for which bill generation is required. This flexibility facilitates the use of different billable dates for different accounts.

Figure 9:
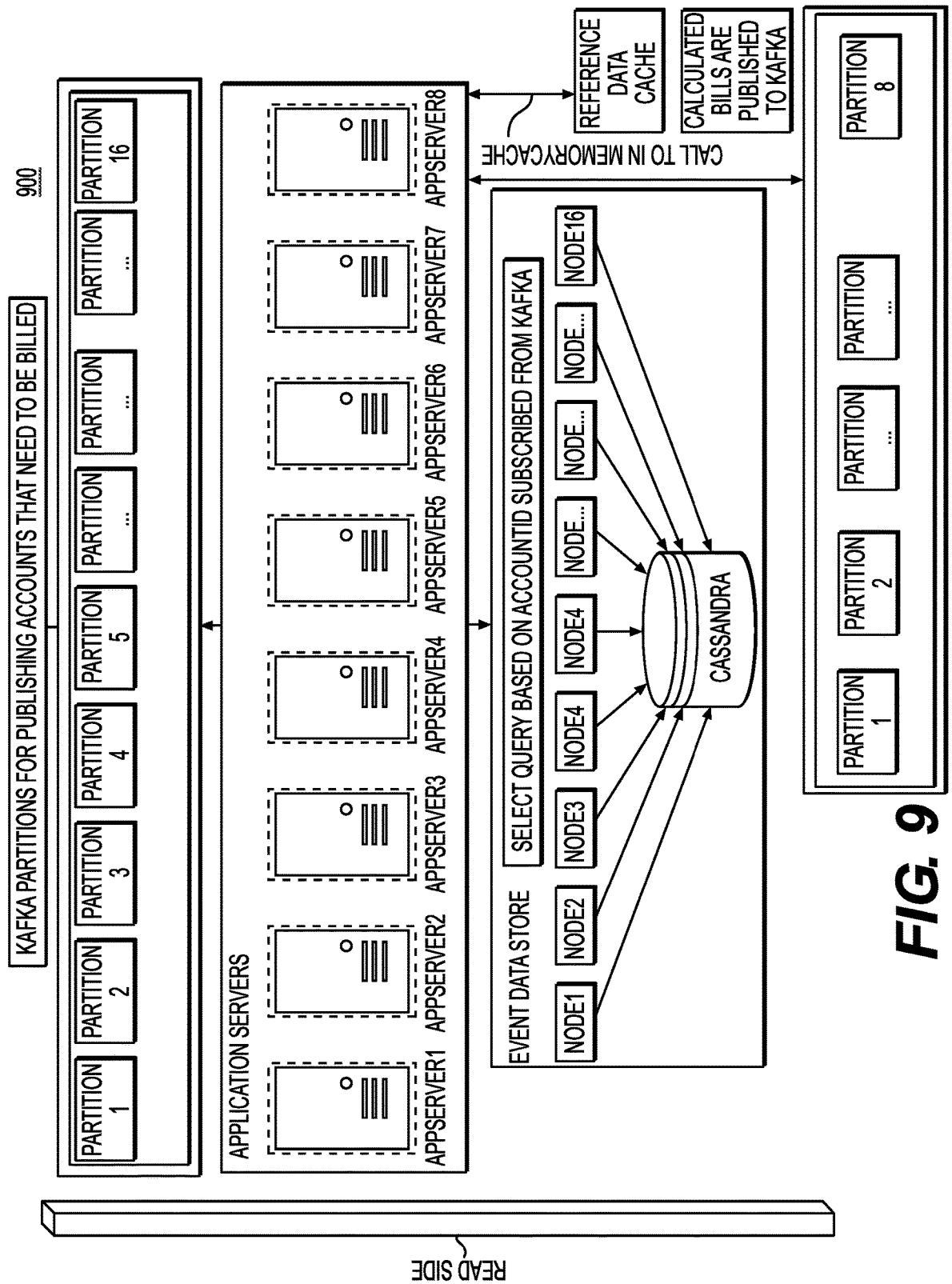
FIG. 9 is a block diagram that illustrates a read side of an architecture of a system that implements a method for providing event-driven billing that facilitates flexibility and customization for bill generation, payment scheduling, and account reconciliation in relation to consumer financial accounts, in accordance with an exemplary embodiment.

FIG. 9 is a block diagram 900 that illustrates a read side of an architecture of a system that implements a method for providing event-driven billing that facilitates flexibility and customization for bill generation, payment scheduling, and account reconciliation in relation to consumer financial accounts, in accordance with an exemplary embodiment.

Most of the business logic of the system lies on the read side. In an exemplary embodiment, the read side includes eight (8) application servers that are reading the Account Identification and Billing Period data from Kafka while operating in parallel. The read side makes subsequent calls to the in-memory cache in order to obtain all the necessary information about the account, such as, for example, pricing information, rate information, account hierarchy, client configuration, and any other relevant account information. Based on all the information collected, the account set-up hierarchy is used for determining which calculation method to use and at what price point, and the bill is then calculated. The calculated bills are published to Kafka in order to enable downstream systems to consume and ship the bills to the customers.

Accordingly, with this technology, an optimized process for implementing methods and systems for providing event-driven billing that facilitates flexibility and customization for bill generation, payment scheduling, and account reconciliation in relation to consumer financial accounts is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations, may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for customizing a timing of generating of at least one bill for at least one account based on an occurrence of at least one event of a predetermined type and periodic time intervals that are selected by at least one user, the method being implemented by at least one processor, the method comprising:

receiving, from the at least one user and by the at least one processor, first information relating to a schedule for generating the at least one bill for the at least one account, based on the occurrence of the at least one event of the predetermined type and the periodic time intervals that are selected by the at least one user;

extracting, from the first information, basing a bill-generating schedule on the occurrence of the at least one event of the predetermined type and the periodic time intervals, by the at least one processor, at least one criterion for determining the schedule for generating the at least one bill;

capturing, by a stream-processing software platform, a plurality of events, each of the plurality of events including an account number as a key;

partitioning and storing, by the at least one processor, the plurality of events in a plurality of first partitions based on the account number of each of the plurality of events, events associated with a same account number being stored in an event source table in a same partition, the processor being configured to scale the partitioning and the storing by increasing a number of the plurality of first partitions;

determining the bill-generating schedule based on the at least one criterion, based on the occurrence of the at least one event of the predetermined type and the periodic time intervals;

publishing, based on the bill-generating schedule, the plurality of events stored in at least one of the plurality of first partitions to corresponding ones of at least one of a plurality of second partitions, a number of the plurality of second partitions being same as the number of the plurality of first partitions to enable parallelism, the at least one of the plurality of first partitions being less than all of the plurality of first partitions; and reading, in parallel and by a plurality of application servers and based on the bill-generating schedule, the account number associated with each of the at least one of the plurality of second partitions and generating the at least one bill for the at least one account based on the plurality of events published to the corresponding ones of the at least one of the plurality of second partitions.

2. The method of claim 1, wherein the at least one user includes persons that are responsible for making payments that relate to the at least one account based on the at least one bill.

3. The method of claim 1, wherein the at least one event of the predetermined type includes a transaction that involves a foreign currency being stored.

4. The method of claim 1, wherein the at least one event of the predetermined type includes a transaction that involves an amount that exceeds a predetermined threshold amount being stored.

5. The method of claim 2, wherein the first information includes information indicating that the schedule for generating the bills is to be determined based on balances of the accounts exceeding a threshold dollar amount that is selected by the at least one user.

6. The method of claim 1, wherein the at least one user is affiliated with a financial institution that administers the accounts.

7. The method of claim 6, wherein the first information includes information indicating that the schedule for generating the bills is to be determined based on balances of the accounts exceeding a threshold dollar amount that is determined by the financial institution.

8. The method of claim 6, wherein the first information includes information indicating that the schedule for generating the bills is to be determined based on rewards to be provided to persons that are responsible for making payments that relate to the accounts based on the generated bills.

9. A computing apparatus for customizing a timing of generating at least one bill for at least one account based on an occurrence of at least one event of a predetermined type and periodic time intervals that are selected by at least one user, the computing apparatus comprising:

an Event-Driven Billing System device including a processor and a plurality of application servers;

a memory; and a communication interface coupled to each of the processor and the memory, wherein the processor is configured to:

receive, from the at least one user via the communication interface, first information relating to a schedule for generating the at least one bill for the at least one account, based on the occurrence of the at least one event of the predetermined type and the periodic time intervals that are selected by the at least one user;

extract, from the first information, basing a bill-generating schedule on the occurrence of the at least one event of the predetermined type and the periodic time intervals, by the processor, at least one criterion for determining the schedule for generating the at least one bill;

capture, by a stream-processing software platform, a plurality of events, each of the plurality of events including an account number as a key;

partition and store, by the at least one processor, the plurality of events in a plurality of first partitions based on the account number of each of the plurality of events, events associated with a same account number being stored in an event source table in a same partition, the processor being configured to scale partitioning and storing of the plurality of events by increasing a number of the plurality of first partitions;

determine the bill-generating schedule based on the at least one criterion, which is based on the occurrence of the at least one event of the predetermined type and the periodic time intervals;

publish, based on the bill-generating schedule, the plurality of events stored in at least one of the plurality of first partitions to corresponding ones of at least one of a plurality of second partitions, a number of the plurality of second partitions being same as the number of the plurality of first partitions to enable parallelism, the at least one of the plurality of first partitions being less than all of the plurality of first partitions; and read, in parallel and by the plurality of application servers and based on the bill-generating schedule, the account number associated with each of the at least one of the plurality of second partitions and generate the at least one bill for the at least one account based on the plurality of events published to the corresponding ones of the at least one of the plurality of second partitions.

10. The computing apparatus of claim 9, wherein the at least one user includes persons that are responsible for making payments that relate to the at least one account based on the generated at least one bill.

11. The computing apparatus of claim 9, wherein the at least one event of the predetermined type includes a transaction that involves a foreign currency being stored.

12. The computing apparatus of claim 9, wherein the at least one event of the predetermined type includes a transaction that involves an amount that exceeds a predetermined threshold amount being stored.

13. The computing apparatus of claim 10, wherein the first information includes information indicating that the schedule for generating the bills is to be determined based on balances of the accounts exceeding a threshold dollar amount that is selected by the at least one user.

14. The computing apparatus of claim 9, wherein the at least one user is affiliated with a financial institution that administers the accounts.

15. The computing apparatus of claim 14, wherein the first information includes information indicating that the schedule for generating the bills is to be determined based on balances of the accounts exceeding a threshold dollar amount that is determined by the financial institution.

16. The computing apparatus of claim 14, wherein the first information includes information indicating that the schedule for generating the bills is to be determined based on rewards to be provided to persons that are responsible for making payments that relate to the accounts based on the generated bills.

\* \* \* \* \*